Dec. 26, 1944. L. B. HAIGH 2,365,698
RECTIFIER AND METHODS OF MAKING THE SAME
Filed Oct. 19, 1943 2 Sheets-Sheet 1
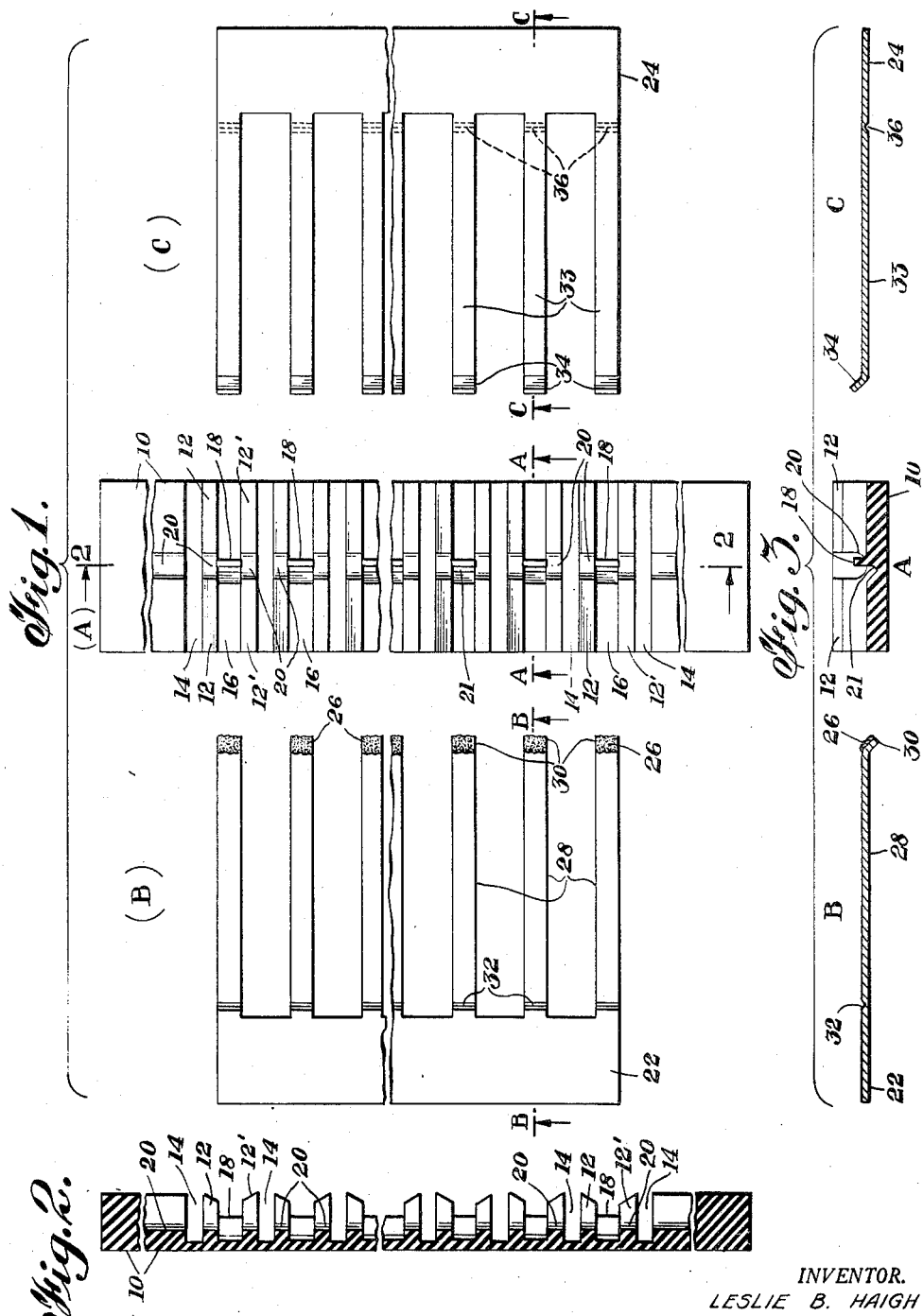
INVENTOR.
LESLIE B. HAIGH
BY
ATTORNEY

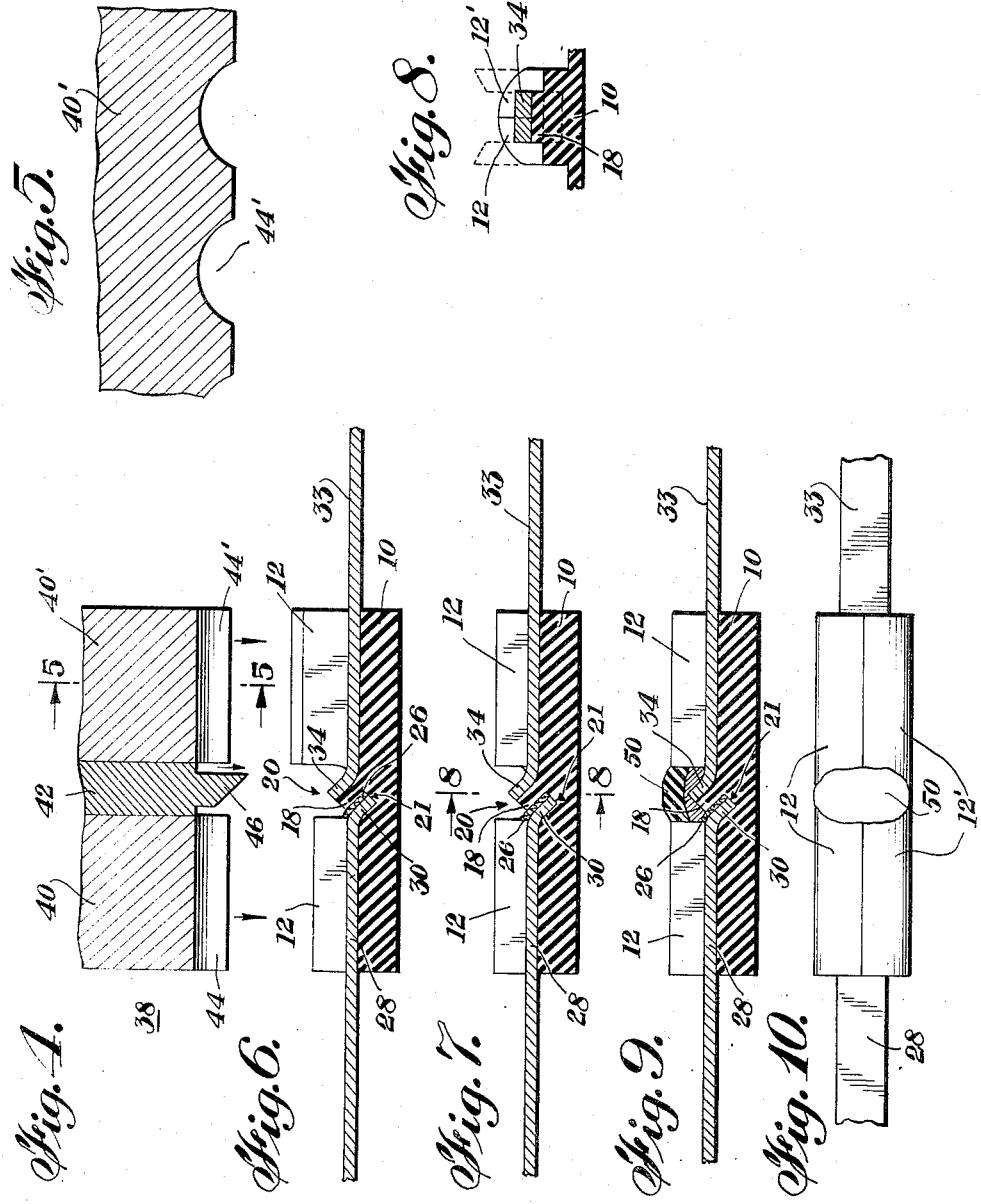

Patented Dec. 26, 1944

2,365,698

UNITED STATES PATENT OFFICE 2,365,698

RECTIFIER AND METHOD OF MAKING THE SAME

Leslie B. Haigh, West Orange, N. J., assignor to Federal Telephone and Radio Corporation, New York, N. Y., a corporation of Delaware Application October 19, 1943, Serial No. 506,799

15 Claims. (Cl. 175—366)

This invention relates to improvements in rectifiers and methods of making the same, and more particularly to the mass production of miniature dry-contact rectifiers.

An object of this invention is to provide a novel, sturdy, easily and cheaply made miniature rectifier.

Another object of this invention is to provide a rectifier which can be efficiently made by mass production methods.

A further object of this invention is the provision of a novel method of assembling and forming small rectifiers.

A more particular object of the present invention is to provide a method whereby a plurality of small rectifiers may be simultaneously manufactured.

Still another object of this invention lies in the provision of a small rectifier manufactured of a minimum number of individual parts with a minimum number of manufacturing and assembling steps.

These and other features, capabilities, and advantages of the invention will appear from the sub-joined detailed description of one specific embodiment thereof, illustrated in the accompanying drawings, in which:

Fig. 1 is a plan view of the three principal components of the rectifier made in accordance with the present invention, shown about three times the size that is contemplated for one embodiment;

Fig. 2 is a longitudinal cross-sectional view taken along the line 2—2 of Fig. 1;

Fig. 3 shows transverse cross-sectional views of the three component parts of Fig. 1, taken along the lines A—A, B—B and C—C;

Fig. 4 is a transverse cross-sectional view through part of a press used in assembling the rectifier elements;

Fig. 5 is a longitudinal cross-sectional view taken along the line 5—5 of Fig. 4;

Fig. 6 is an enlarged transverse cross-sectional view of one of the rectifier units, showing the unit in a partially completed stage;

Fig. 7 is a similar transverse cross-sectional view illustrating a rectifier unit in an intermediate assembly step;

Fig. 8 is a vertical cross-sectional view taken along the line 8—8 of Fig. 7;

Fig. 9 is a transverse cross-sectional view of a completed rectifier; and

Fig. 10 is a top plan view of the rectifier unit illustrated in Fig. 9.

In accordance with the present invention a plurality of small rectifiers are adapted to be built upon a single insulating base 10, such as shown in Figs. 1 (A), 2, and 3 (A), preferably of thermo-plastic material. This insulating base has molded or otherwise formed therein a plurality of pairs of spaced walls 12, 12' extending transversely across the face of one plate and being spaced from one another and from the ends of the plate by transverse, relatively deep grooves 14. Between each pair of walls 12, 12' is formed a shallower groove 16. At substantially the center of the groove 16 is formed an upstanding lug or tab 18, integral with the base plate. A longitudinal groove 20 may extend substantially the length of the base plate 10 and in any event will divide each one of the walls 12, 12' and intersect the transverse shallow grooves 16. The upstanding tab 18 may be formed substantially at the intersection of the longitudinal groove 20 with each of the transverse grooves 16.

For insertion into the grooves 16, in a manner to be described in more detail hereinafter, I provide a pair of metal combs 22 and 24 illustrated in Figs. 1 (B) and (C), and 3 (B) and (C). The comb 22 is provided with a plurality of teeth 28 longitudinally spaced with a spacing corresponding to the distance between the transverse grooves 16 in the base plate 10, and each tooth having a width substantially equal to the width of each one of the aforementioned grooves. Each tooth, more particularly as shown in Fig. 3 (B), is formed at one end with a downward projection 30, while at its other end adjacent the base of the comb may be provided with a small notch 32 for ready separation from the comb base. The upper surface of each projection 30 is covered with a layer of rectifying material, such as selenium layer 26. This selenium layer may be applied in any suitable manner known to the art.

The metal comb 24 is substantially identical with comb 22, but has no rectifying coating, being provided with a plurality of teeth 33 spaced similarly to the teeth 28 of the comb 22. In this case, however, the comb is reversed, one end of each of the teeth 33 is provided with an upwardly-extending toe 34, while the other end of each tooth may also be provided with a notch 36 to assist in later separation from the comb base.

After the three parts of the rectifier shown in Figs. 1 and 3 have been molded, stamped and coated, as the case may be, assembly of these elements into a plurality of rectifier units may follow. First of all the teeth 28 of the comb 22 are inserted into the respective slots 16 of the insulating base 10 until the downwardly-projecting ends 30 fall into small depressions 21 formed in the individual grooves 16 adjacent the upstanding tabs 18. This assembly may then be placed in a heated press such as shown in Figs. 4 and 5.

The press may be a compound press having two side sections 40, 40' and a central, separately movable section 42. The side press sections 40, 40' are provided with respective arches 44, 44' which are used to turn over the walls 12, 12' of the individual grooves 16. The center section of the press bears a hot punch 46 which turns the tabs 18 over the downwardly-extending ends 30 of the individual selenium-coated teeth 28. The side press section 40 and the central section 42 are adapted to work simultaneously, turning walls 12 and 12' over the teeth 28 of the one comb, and the tabs 18 over the selenium-coated ends 30. The rectifier will then appear as shown in Fig. 6. This serves to longitudinally position each tooth 28 in its respective groove 16. It will be noted, however, as more particularly shown in Figs. 6 and 7, that the bent-over tab 18 does not fully cover the selenium coating 26 on the individual downwardly-turned ends 30 but leaves a small portion of this coating exposed.

The teeth 33 are then inserted in the grooves 16 from the other side of the base until their up-turned ends 34 rest against the individual upper faces of the bent-over tabs 18. The hot press 40' is then operated so that its arched section 44' turns the opposite walls 12, 12' over each inserted tooth, in which case the resultant structure will be somewhat as shown in Figs. 7 and 8. The turning over of the walls 12, 12' holds the teeth 33 firmly to the insulating base 10 and the teeth 28 and 33 may then serve as leads for each rectifier unit. Finally, in the groove 20 formed centrally between the turned over walls 12, 12', counter-electrode alloy is sprayed or otherwise applied as a continuous coating over the up-turned end 34 of each lead 33 and over the small selenium-coated exposed portion of the downwardly extending end 30 of the lead 28. When this operation has been completed the teeth 28 and 33 now form leads for the individual rectifier units and may be broken from their respective comb bases as through the notches 32 and 36 and the individual rectifiers may be separated by breaking up the base in the relatively deep grooves 14. The groove 20 in each rectifier may then be filled with insulation 50 to cover the counter-electrode alloy. The final form of the individual rectifier will appear as shown in plan view in Fig. 10.

It will be seen that I have provided a rectifier structure which fulfills the objects primarily stated. The manufacture and assembly of the rectifiers can be easily carried out by mass production methods, for example, the base plate and combs may be of such size that at least twenty-five rectifiers may be handled simultaneouslsy. In addition to its ease in manufacture the finally formed rectifier units are sturdy, strong, and are provided with a pair of integral leads rigidly attached to the insulating base.

While the invention is primarily directed to the manufacture of selenium rectifiers, it will be obvious to those skilled in this art that other semi-conductor materials may be used, and while I have described my invention above in connection with one specific embodiment and one specific method, it is to be clearly understood that this description is made only by way of example and not as a limitation on the scope of my invention as set forth in the objects and the accompanying claims.

I claim:

1. A rectifier comprising a substantially rectangular insulating base having a longitudinal groove extending across one face and a transverse groove across the same face intersecting the longitudinal groove, a first metal lead having a coating of rectifying material on one end inserted in one end of said longitudinal groove to such a distance that its coated end is positioned substantially at the intersection of the two grooves, a second metal lead inserted in the other side of said longitudinal groove to such a distance that one end is positioned substantially at the intersection of the two grooves and spaced from the coated end of the first lead, the walls of the longitudinal groove being bent over their respective leads to hold them in place in their respective sides of the longitudinal groove, and counter-electrode alloy at the intersection of the two grooves electrically inter-connecting the coated end of the one lead with the juxtaposed end of the second lead.

2. The combination according to claim 1, in combination with further insulating material in the transverse groove covering the two lead ends and the counter-electrode alloy at the intersection of the two grooves.

3. A rectifier comprising a substantially rectangular insulating base having a longitudinal groove across one face and a transverse groove across the same face intersecting the longitudinal groove, a first metal lead having a coating of rectifying material on one end inserted in one side of said longitudinal groove to such a distance that its coated end is positioned substantially at the intersection of the two grooves, a tab of insulating material integral with said base, positioned substantially at the intersection of the two grooves and bent over and partially covering the coated end of said first lead, a second metal lead inserted at the other side of the said longitudinal groove to such a distance that one end is positioned substantially at the intersection of the two grooves and spaced from the coated end of the first lead by said integral tab, the walls of the longitudinal groove being bent over the respective leads to hold them in place in their respective sides of the longitudinal groove, and counter-electrode alloy at the intersection of the two grooves inter-connecting the coated end of the one lead with the juxtaposed end of the second lead.

4. The combination according to claim 3, in combination with further insulating material in the transverse groove covering the two lead ends and the counter-electrode alloy at the intersection of the two grooves.

5. A rectifier comprising a substantially rectangular insulating base having a longitudinal groove extending across one face, a transverse groove across the same face intersecting the longitudinal grooves, and a depression substantially at the intersection of said two grooves, a first metal lead having a downwardly-turned end, said lead being inserted in one side of said longitudinal groove with its downwardly-turned end in said depression, a coating of rectifying material on the upper face of said downwardly-turned end, a tab of insulating material integral with said base, bent over and on one side partially covering the upper face of said downwardly-turned end, a second metal lead having an upwardly-turned end inserted in the other side of said longitudinal groove to such a distance that the bottom face of its upwardly-turned end rests against the other side of said bent-over tab, the walls of said longitudinal groove being bent over the respective leads to hold them in place in their respective sides of the longitudinal groove, and counter-electrode alloy in the intersection of the two grooves electrically interconnecting the coated end of the one lead with the up-turned end of the second lead.

6. The combination according to claim 5, in combination with further insulating material in the transverse groove covering the two lead ends and the counter-electrode alloy at the intersection of the two grooves.

7. The combination according to claim 5 in which the rectifying material is selenium.

8. The method of constructing a rectifier which includes the steps of molding a substantially rectangular insulating base with a longitudinal groove in one face and a transverse groove in the same face intersecting the longitudinal groove, inserting a selenium-coated metal lead into one side of said longitudinal groove for such a distance that one end of said lead is positioned substantially at the intersection of said two grooves, inserting a second metal lead into the other side of said longitudinal groove for such a distance that one end of said second lead is positioned substantially at the intersection of said two grooves, but longitudinally spaced from the end of the first lead, turning the sides of the longitudinal groove inwardly and downwardly over the leads to hold them in place, and electrically joining said two lead ends with a counter-electrode alloy.

9. The method according to claim 8 which includes the further step of filling said transverse groove with insulating material to cover the lead ends and the alloy.

10. The method of making a rectifier which includes the steps of molding a substantially rectangular insulating base with a longitudinal groove in one face, a transverse groove in the same face intersecting the longitudinal groove, and an upstanding tab substantially at the intersection of the two grooves, inserting a selenium-coated metal lead into one side of said longitudinal groove so that one end of said lead abuts said tab, bending said tab down over part of the end of said lead, leaving a portion of the selenium coating exposed, inserting a second metal lead into the other side of said groove for such a distance that one end of the second lead rests against the bent-over portion of said tab, turning the sides of the longitudinal groove inwardly and downwardly over the leads to hold them in place, and electrically joining the selenium-coated portion of the first lead with the end of the second lead with a counter-electrode alloy.

11. The method according to claim 10 which includes the further step of filling said transverse groove with insulating material to cover the lead ends and the alloy.

12. The method of simultaneously making a plurality of rectifiers which includes the steps of molding a common base form with a plurality of equally spaced relatively deep transverse grooves each separated by a pair of transverse walls in turn separated by a relatively shallow groove, and a common central longitudinal groove dividing each pair of transverse walls, forming two metal combs each having a plurality of longitudinally spaced teeth corresponding to the spacing and number of said shallow grooves and each tooth having a width substantially equal to the width of the shallow groove, coating the teeth of one comb with selenium, inserting the teeth of the one comb into one side of the respective shallow grooves with the ends of these teeth extending into the longitudinal dividing groove, inserting the teeth of the second comb into the other side of the respective shallow grooves until the ends of the teeth extend into the longitudinal dividing groove but are spaced from the ends of the first teeth, turning each pair of transverse walls down and over the respective inserted teeth, electrically interconnecting the coated ends of the teeth of one comb severally with the adjacent ends of the teeth of the other comb with a counter-electrode alloy, breaking the teeth from the base of their respective combs, and breaking the base form into individual rectifier units along the deep transverse grooves.

13. The method according to claim 12 which includes the further step of filling the longitudinal groove dividing the transverse walls of each rectifier with insulating material after the base form is broken into individual units.

14. The method of simultaneously making a plurality of rectifiers which includes the steps of molding a common base form with a plurality of equally spaced, relatively deep transverse grooves each separated by a pair of transverse walls separated in turn by a relatively shallow groove, a common central longitudinal groove dividing each pair of transverse walls and an upstanding tab at the intersection of each shallow groove with the central longitudinal groove, forming two metal combs each having a plurality of spaced teeth corresponding to the spacing and number of said shallow grooves and each tooth having a width substantially equal to the width of the shallow groove, coating the teeth of one comb with selenium, inserting the teeth of the one comb into one side of the respective shallow grooves until the ends of these teeth abut against the respective upstanding tabs, bending said tabs down over part of the coated ends of the individual teeth, inserting the teeth of the second comb into the other side of the respective shallow grooves until the ends of said teeth rest against the bent-over portions of the tabs, turning each pair of transverse walls down and over the respective inserted teeth, electrically interconnecting the coated ends of the teeth of one comb with the adjacent ends of the teeth of the other comb with a counter-electrode alloy, breaking the teeth from the base of their respective combs and breaking the base form into individual rectifier units along the deep transverse grooves.

15. The method according to claim 14 which includes the further step of filling the longitudinal groove dividing the transverse walls of each rectifier with insulating material after the base form is broken into individual units.

LESLIE B. HAIGH.